United States Patent
Suzuki et al.

(10) Patent No.: US 7,413,825 B2
(45) Date of Patent: Aug. 19, 2008

(54) FUEL CELL

(75) Inventors: Masaharu Suzuki, Utsunomiya (JP);
Naoyuki Enjoji, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 268 days.

(21) Appl. No.: 10/515,672

(22) PCT Filed: May 20, 2003

(86) PCT No.: PCT/JP03/06248

§ 371 (c)(1),
(2), (4) Date: Nov. 22, 2004

(87) PCT Pub. No.: WO03/098727

PCT Pub. Date: Nov. 27, 2003

(65) Prior Publication Data

US 2005/0221151 A1    Oct. 6, 2005

(30) Foreign Application Priority Data

May 21, 2002  (JP) ............................. 2002-145889
May 16, 2003  (JP) ............................. 2003-139176

(51) Int. Cl.
  *H01M 2/00* (2006.01)
  *H01M 2/02* (2006.01)
(52) U.S. Cl. .......................... 429/34; 429/39
(58) Field of Classification Search ................ 429/34, 429/39
  See application file for complete search history.

(56) References Cited

U.S. PATENT DOCUMENTS 3,833,424 A * 9/1974 Louis et al. ................... 429/37
4,599,282 A   7/1986 Hirota et al.
2001/0019793 A1 9/2001 Tsuyoshi

FOREIGN PATENT DOCUMENTS

| JP | 61-056769 | 3/1986 |
| JP | 61-56769 U | 4/1986 |
| JP | 06-275304 | 9/1994 |
| JP | 11-144753 | 5/1999 |
| JP | 2001-266910 | 9/2001 |
| JP | 2002-050392 | * 2/2002 ........... 429/34 |
| WO | WO-00/31815 | 6/2000 |

* cited by examiner

*Primary Examiner*—Patrick Ryan
*Assistant Examiner*—Ben Lewis
(74) *Attorney, Agent, or Firm*—Lahive & Cockfield, LLP; Anthony A. Laurentano, Esq.

(57) ABSTRACT

A fuel cell (10) is formed by sandwiching a membrane electrode assembly (14) between first and second separators (16, 18). An oxygen-containing gas supply passage (20) extends through the fuel cell (10) in a stacking direction. The oxygen-containing gas passage (20) includes first and second straight sections (20$a$, 20$b$) to form a single opening. The first and second straight sections are elongated in directions indicated by arrows B and C around a corner at an upper portion of one end of the first separator (16).

12 Claims, 13 Drawing Sheets

FUEL CELL

RELATED APPLICATIONS

This application is a 35 U.S.C. 371 national stage filing of International Application No. PCT/JP03/06248, filed 20 May 2003, which claims priority to Japan Patent Application No. 2002-145889 filed on 21 May 2002, and Japan Patent Application No. 2003-139176 filed 16 May 2003, in Japan. The contents of the aforementioned applications are hereby incorporated by reference.

TECHNICAL FIELD

The present invention relates to a fuel cell including an electrolyte electrode assembly and a pair of separators sandwiching the electrolyte electrode assembly. The electrolyte electrode assembly includes electrodes and an electrolyte interposed between the electrodes.

BACKGROUND OF THE INVENTION

For example, a solid polymer fuel cell includes an electrolyte electrode assembly and separators sandwiching the electrolyte electrode assembly. The electrolyte electrode assembly includes an anode, a cathode, and an electrolyte (electrolyte membrane) interposed between the anode and the cathode. The electrolyte is a polymer ion exchange membrane (proton ion exchange membrane). Generally, when this type of the fuel cell is used, predetermined numbers of electrolyte electrode assemblies and separators are stacked together to form a fuel cell stack.

In the fuel cell stack, a fuel gas (reactant gas) such as a gas chiefly containing hydrogen (hereinafter also referred to as the hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating a DC electrical energy. An oxidizing gas (reactant gas) such as a gas chiefly containing oxygen (hereinafter also referred to as the oxygen-containing gas) is supplied to the cathode. At the cathode, the hydrogen ions from the anode combine with the electrons and oxygen to produce water.

In the fuel cell, a fuel gas flow field (reactant gas flow field) is formed on a surface of the separator facing the anode for supplying the fuel gas to the anode. An oxygen-containing gas flow field (reactant gas flow field) is formed on a surface of the separator facing the cathode for supplying the oxygen-containing gas to the cathode. Further, this type of the fuel cell adopts an internal manifold in which fluid passages extend through the electrolyte electrode assembly and the separators in the stacking direction for allowing the oxygen-containing gas and the fuel gas as reactant gases to flow into, and flow out of the reactant gas flow fields.

For example, in a solid polymer electrolyte fuel cell disclosed in Japanese Laid-Open Patent Publication No. 2001-266910, as shown in FIG. 13, at one end of a separator 1 of the fuel cell in a direction indicated by an arrow X, an oxygen-containing gas supply passage 2a for supplying an oxidizing gas such as an oxygen-containing gas, and a fuel gas supply passage 3a for supplying a fuel gas such as a hydrogen-containing gas are formed.

At the other end of the separator 1 in the direction indicated by the arrow X, an oxygen-containing gas discharge passage 2b for discharging the oxygen-containing gas, a fuel gas discharge passage 3b for discharging the fuel gas are formed. The separator 1 has an oxygen-containing gas flow field 4 on its surface 1a facing a cathode (not shown). For example, the oxygen-containing gas flow field 4 includes a plurality of grooves extending in the direction indicated by the arrow X. The oxygen-containing gas flow field 4 is connected to the oxygen-containing gas supply passage 2a and the oxygen-containing gas discharge passage 2b.

However, since the oxygen-containing gas supply passage 2a is provided at a right side of one end the separator 1 in the direction indicated by the arrow X, when the oxygen-containing gas is supplied from oxygen-containing gas supply passage 2a vertically in the direction indicated by the arrow X toward the oxygen-containing gas flow field 4, in particular, it is difficult to sufficiently supply the oxygen-containing gas to an area near the fuel gas supply passage 3a (left side of one end in the direction indicated by the arrow X).

Therefore, the number of grooves (part of the oxygen-containing gas flow field 4) for virtually guiding the oxygen-containing gas from the oxygen-containing gas supply passage 2a to the electrode surface is limited. Thus, the pressure loss in the grooves of the oxygen-containing gas flow field is increased. Components such as a compressor for supplying the oxygen-containing gas are large. Consequently, it is not possible to reduce the size and the weight of the facility. It is not possible to supply the reactant gas to the electrode surface uniformly, and the power generation performance is low.

Further, the separator 1 does not have any fluid passages on the two opposite sides 1b in the direction indicated by the arrow Y perpendicular to the direction indicated by the arrow X. Thus, these sides 1b tend to be exposed to the external air. Consequently, water condensation occurs in the flow grooves near the sides 1b. Since the condensed water is retained, the power generation performance may be lowered undesirably.

SUMMARY OF THE INVENTION

The present invention solves this type of problem, and an object of the present invention is to provide a fuel cell having a simple structure in which the size of a separator is reduced, and the power generation performance is maintained effectively.

In the fuel cell according to the present invention, a reactant gas supply passage and a reactant gas discharge passage extend through separators in a stacking direction for supplying at least an oxygen-containing gas or a fuel gas as a reactant gas to a reactant gas flow field formed in the separator facing a membrane electrode assembly and discharging the reactant gas from the reactant gas flow field. At least the reactant gas supply passage or the reactant gas discharge passage (hereinafter also simply referred to as the "fluid passage") includes first and second straight sections extending along two sides from a corner of the separator.

As described above, the fluid passage includes the first and second straight sections extending along two sides of the separator. Therefore, when the reactant gas is supplied to the reactant flow field from different directions, the flows of the different directions collide with each other, and the reactant gas is uniformly distributed into the reactant gas flow field. Thus, it is possible to uniformly and reliably supply the reactant gas to the electrode surface. Further, the reactant gas is supplied to the reactant gas flow field from different directions, and the area of the flow field for guiding the reactant gas from the fluid passage to the electrode surface is large in comparison with the conventional structure. Thus, it is possible to supply the reactant gas uniformly to the entire area of the electrode surface, and the pressure loss of the reactant gas in the flow field is reduced effectively. Consequently, the compressor or the like for supplying the reactant gas is not large, and the thin cell structure is achieved.

Since the fluid passages are provided at outer edges of the separator including the corners of the separator, the space in the separator surface is utilized effectively, and the electrode surface utilization ratio in the separator is improved. Accordingly, the size and the weight of the entire fuel cell are reduced.

According to another aspect of the present invention, the first and second straight sections are separated from each other at the corner of the separator. The rib is provided between the first and second straight sections. Therefore, the corner of the separator is reinforced suitably by the rib. Thus, the strength of the separator is improved.

According to another aspect of the present invention, the rib has a hole for inserting a stack tightening bolt or a positioning knock. Thus, the separator surface is used efficiently, and the overall size of the fuel cell is reduced easily.

According to another aspect of the present invention, a coolant supply passage and a coolant discharge passage (hereinafter also simply referred to as the "fluid passage") extend through the separators in the stacking direction for supplying and discharging a coolant. Further, the reactant gas supply passage, the reactant gas discharge passage, the coolant supply passage, and the coolant discharge passage are formed around an electrode surface of the electrolyte electrode assembly.

Therefore, the electrode surface is not directly cooled by the external air. The water condensation in the electrode surface is prevented effectively. Thus, it is possible to use the humidifying water effectively, reduce the amount of the condensed water in the electrode surface, and prevent the decrease in the power generation performance. Further, when a seal member is provided around the fluid passages, the separator surface includes no area where the seal pressure is not applied insufficiently, and the seal surface pressure is applied uniformly to the separator surface.

According to another aspect of the present invention, the electrolyte electrode assembly and the separators are stacked horizontally. Therefore, part of the fluid passage is lower than the electrode surface. Even if the condensed water is retained in the fluid passage, the reactant gas flow field is not filled with the condensed water. Thus, the condensed water is discharged efficiently, and the water is not retained on the electrode surface. Therefore, the desired power generation performance is maintained.

According to another aspect of the present invention, buffers connecting the reactant gas flow field and the reactant gas supply passage and the reactant discharge passage are provided at corners of the separator. Therefore, the reactant gas flows from the reactant gas supply passage to the reactant gas discharge passage through the reactant gas flow field smoothly.

According to another aspect of the present invention, the separator has a substantially rectangular shape in a plan view. At least one of the reactant gas supply passages and at least one of reactant gas discharge passages are provided around corners at diagonal positions of the separator. Therefore, the reactant gas flows in the separator surface suitably.

According to another aspect of the present invention, the separator has a substantially rectangular shape in a plan view. At least one of the reactant gas flow fields includes a substantially U-shaped groove on a separator surface. One of the reactant gas supply passages and one of the reactant gas discharge passages connected to one of the reactant gas flow fields are provided around the adjacent corners of the separator. Therefore, in addition to the substantially straight groove, the substantially U-shaped groove is provided in the separator surface effectively.

According to another aspect of the present invention, the separator has a substantially square shape in a plan view. An inlet buffer is provided near at least one of the reactant gas supply passages and an outlet buffer is provided near at least one of the reactant gas discharge passages. The reactant gas flow field includes straight grooves between the inlet buffer and the outlet buffer. The substantially straight grooves herein include wave pattern grooves curved or bent along the flow direction of the reactant gas. Therefore, the pressure loss of the reactant gas in the reactant gas flow field is minimized. In particular, if the electrode surface has a substantially square shape, the outer circumferential dimension of the separator is minimized. Further, it is possible to improve the heat retaining property of the separator.

According to another aspect of the present invention, at least one of an inlet end position and an outlet end position of the reactant gas flow field is substantially in alignment with at least one of an end position of the reactant gas supply passage and an end position of the reactant gas discharge passage extending toward the reactant gas flow field.

If the end of the reactant gas supply passage extends inwardly toward the reactant gas flow field beyond the inlet end position of the reactant gas flow field, the reactant gas may not flow from the end of the reactant gas supply passage into the reactant gas flow field. Therefore, by setting the end position, it is possible to supply the reactant gas uniformly in the width direction perpendicular to the flow direction of the reactant gas flow field. Thus, the desired power generation function can be achieved.

According to another aspect of the present invention, the cross sectional area of the opening of the reactant gas supply passage is larger than the cross sectional area of the opening of the reactant gas discharge passage. The flow rate of the reactant gas near the reactant gas discharge passage is small after consumption of the reactant gas. Since the cross sectional area of the opening of the reactant gas discharge passage is smaller than the cross sectional area of the opening of the reactant gas supply passage, the reactant gas flows smoothly.

DESCRIPTION OF THE ILLUSTRATED EMBODIMENT

Figure 1:
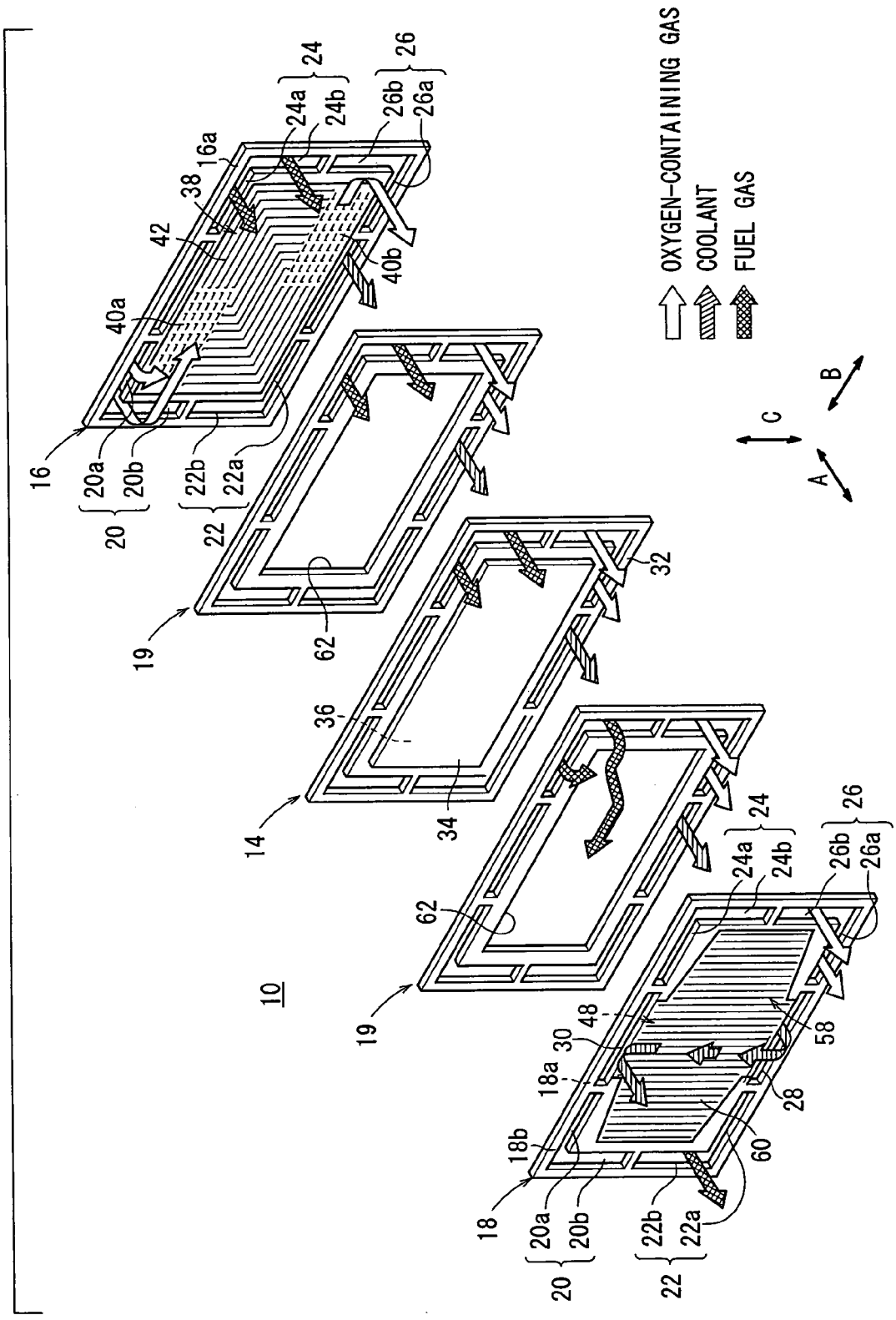
FIG. 1 an exploded perspective view showing main components of a fuel cell according to a first embodiment of the present invention.
Figure 2:
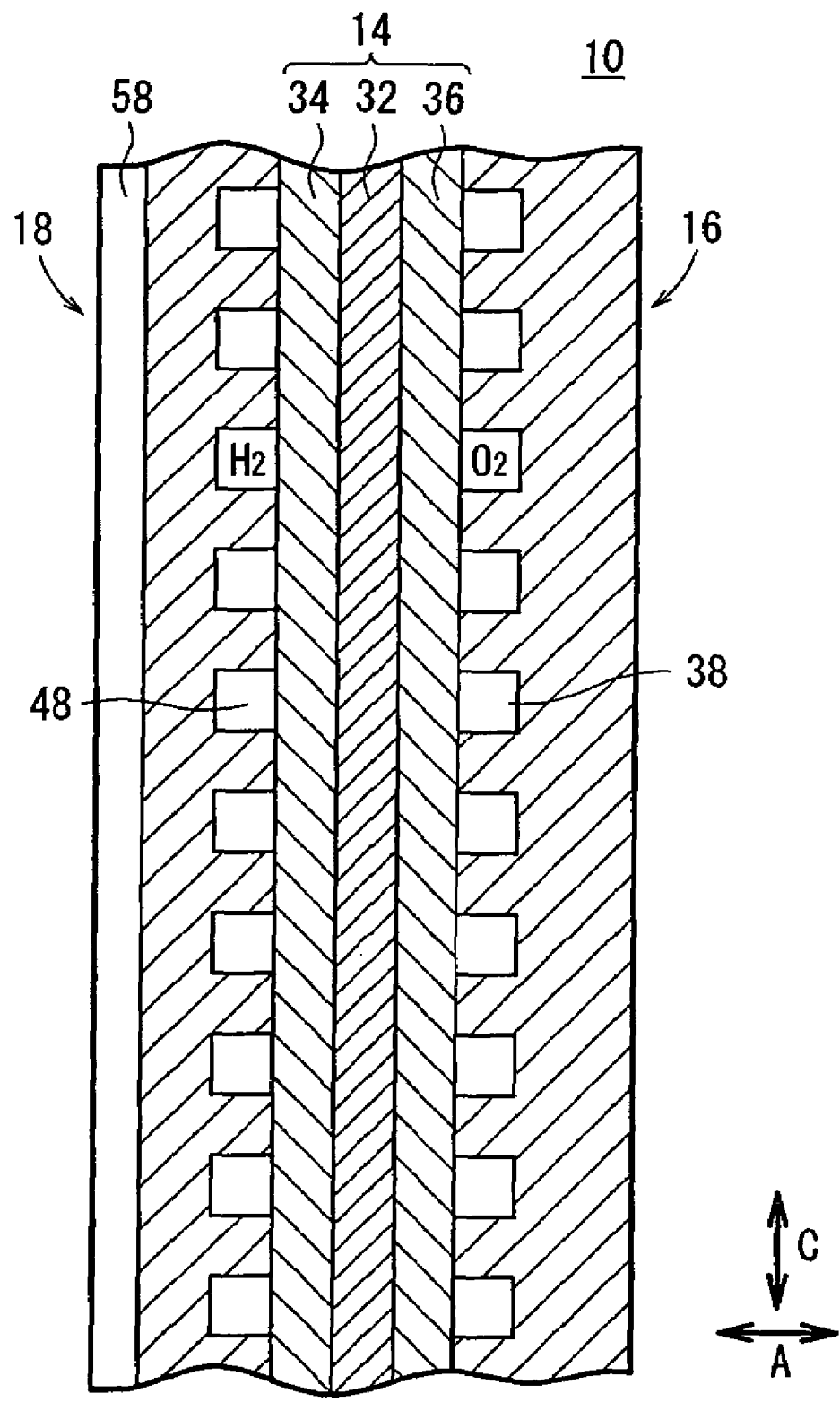
FIG. 2 is a cross sectional view showing part of the fuel cell.

FIG. 1 is an exploded perspective view showing main components of a fuel cell 10 according to a first embodiment of the present invention. FIG. 2 is a cross sectional view showing part of the fuel cell 10.

The fuel cell 10 includes a membrane electrode assembly (electrolyte electrode assembly) 14 and rectangular (substantially rectangular) first and second separators 16, 18 sandwiching the membrane electrode assembly 14. Seal members 19 such as gaskets are provided around fluid passages and electrode surfaces (power generation surfaces), as described later, between the membrane electrode assembly 14 and the first and second separators 16, 18.

The membrane electrode assembly 14 and the first and second separators 16, 18 are stacked in a horizontal direction indicated by an arrow A. At one end of the membrane electrode assembly 14 and the first and second separators 16, 18 in a direction (horizontal direction in FIG. 1) indicated by an arrow B perpendicular to the stacking direction, an oxygen-containing gas supply passage 20 for supplying an oxidizing gas such as an oxygen-containing gas, a fuel gas discharge passage 22 for discharging a fuel gas such as a hydrogen-containing gas are formed. The oxygen-containing gas supply passage 20 and the fuel gas discharge passage 22 extend through membrane electrode assembly 14 and the first and second separators 16, 18 in the stacking direction.

The oxygen-containing gas supply passage 20 includes first and second straight sections 20a, 20b elongated in a direction indicated by an arrow B and in a direction indicated by an arrow C (along two sides) from a corner at an upper portion of one end of the first separator 16. The first and second straight sections 20a, 20b form a single opening. The fuel gas discharge passage 22 includes first and second straight sections 22a, 22b elongated in the direction indicated by the arrow B and in the direction indicated by the arrow C (along two sides) from a corner at a lower portion of one end of the first separator 16. The first and second straight sections 22a, 22b form a single opening.

At the other end of the membrane electrode assembly 14 and the first and second separators 16, 18 in the direction indicated by the arrow B, a fuel gas supply passage 24 for supplying the fuel gas, an oxygen-containing gas discharge passage 26 for discharging the oxygen-containing gas are formed. The fuel gas supply passage 24 and the oxygen-containing gas discharge passage 26 extend through the membrane electrode assembly 14 and the first and second separators 16, 18 in the direction indicated by the arrow A. The fuel gas supply passage 24 includes first and second straight sections 24a, 24b elongated in the direction indicated by the arrow B and in the direction indicated by the arrow C (along two sides) from a corner at an upper portion of the other end of the first separator 16. The oxygen-containing gas discharge passage 26 includes first and second straight sections 26a, 26b elongated in the direction indicated by the arrow B and in the direction indicated by the arrow C (along two sides) from a corner at a lower portion of the other end of the first separator 16.

At a lower edge portion of the membrane electrode assembly 14 and the first and second separators 16, 18, a coolant supply passage 28 for supplying a coolant such as pure water, an ethylene glycol or an oil is provided. At an upper edge portion of the membrane electrode assembly 14 and the first and second separators 16, 18, a coolant discharge passage 30 for discharging the coolant is provided.

The membrane electrode assembly 14 comprises an anode 34, a cathode 36, and a solid polymer electrolyte membrane (electrolyte) 32 interposed between the anode 34 and the cathode 36. The solid polymer electrolyte membrane 32 is formed by impregnating a thin membrane of perfluorosulfonic acid with water, for example.

Each of the anode 34 and cathode 36 has a gas diffusion layer such as a carbon paper, and an electrode catalyst layer of platinum alloy supported on carbon particles. The carbon particles are deposited uniformly on the surface of the gas diffusion layer.

Figure 3:
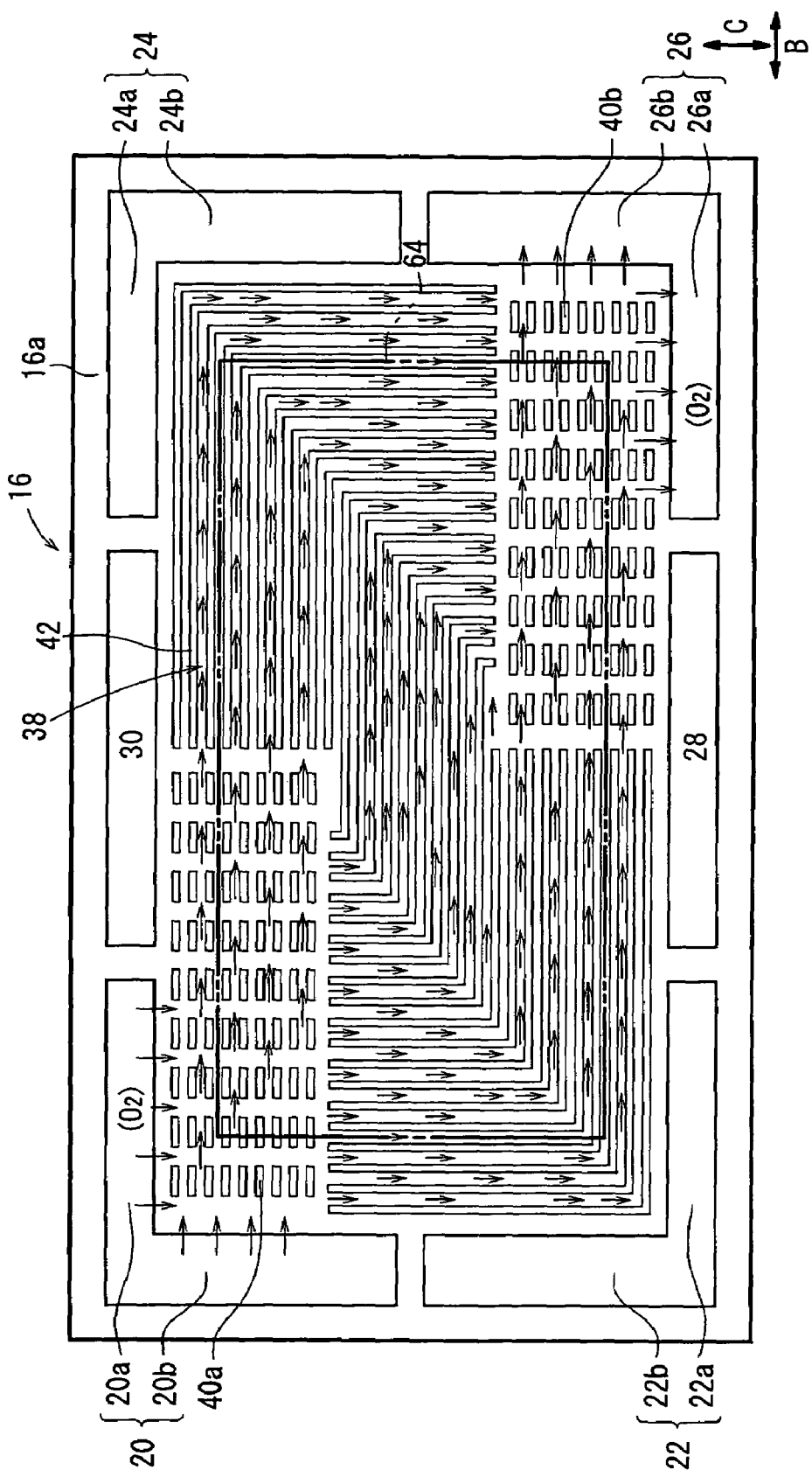
FIG. 3 is a front view showing a first separator of a fuel cell.

As shown in FIGS. 1 and 3, the first separator 16 has an oxygen-containing gas flow field (reactant gas flow field) 38 on its surface 16a facing the cathode 36 for supplying the oxygen-containing gas along the cathode 36. The oxygen-containing gas flow field 38 includes first and second buffers 40a, 40b near the oxygen-containing gas supply passage 20 and the oxygen-containing gas discharge passage 26 and a plurality of oxygen-containing gas flow grooves 42 connected to the first and second buffers 40a, 40b.

The first and second buffers 40a, 40b are formed by a plurality of discontinuous flow grooves or bosses. The oxygen-containing gas flow grooves 42 extend in parallel with each other on the surface 16a. Each of the oxygen-containing gas flow grooves 42 are curved.

Figure 4:
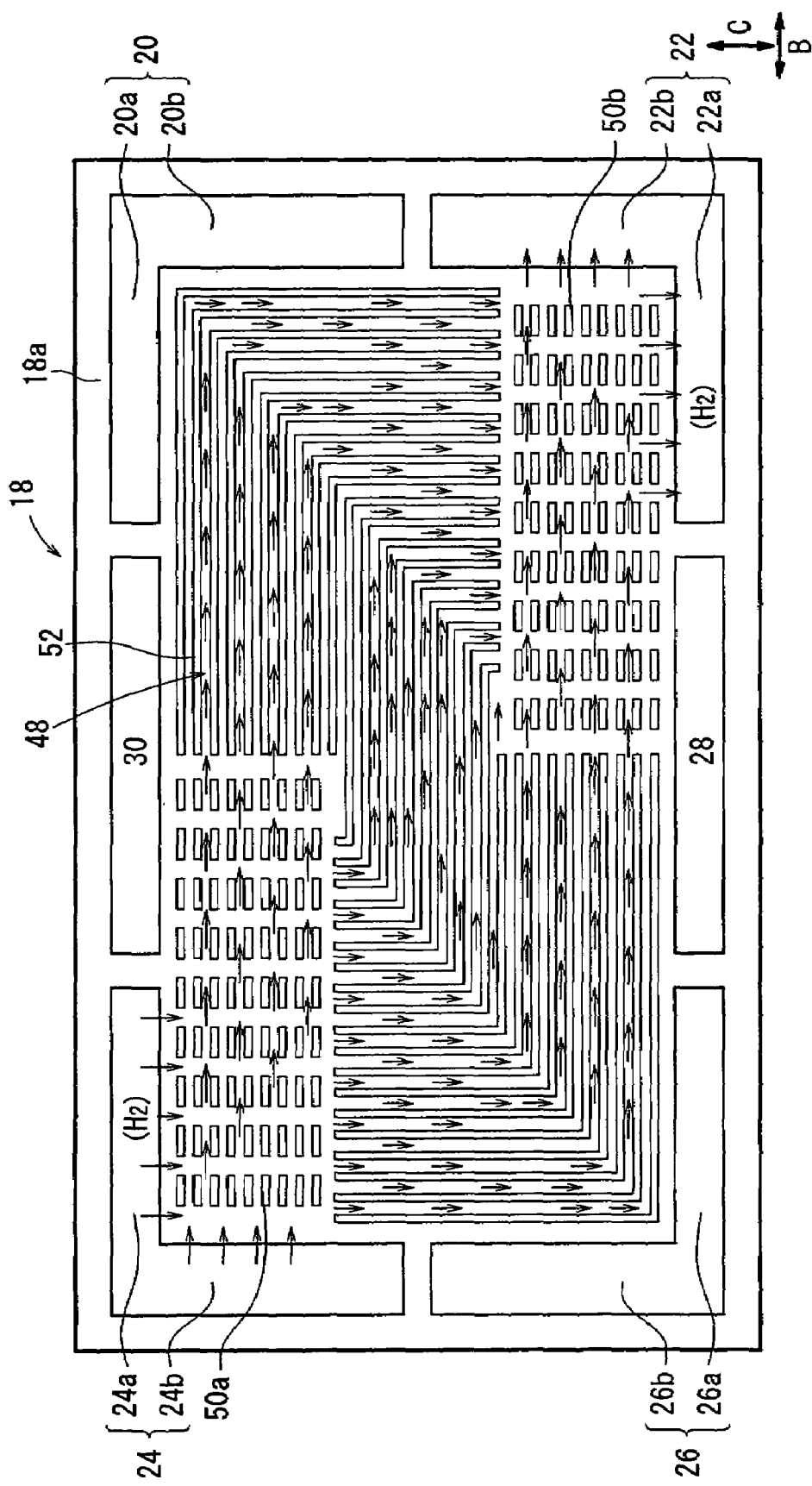
FIG. 4 is a front view showing a second separator of a fuel cell.

As shown in FIG. 4, the second metal separator 18 has a fuel gas flow field (reactant gas flow field) 48 on its surface 18a facing the anode 34 for supplying the fuel gas along the anode 34. The fuel gas flow field 48 includes first and second buffers 50a, 50b near the fuel gas supply passage 24 and the fuel gas discharge passage 22 and a plurality of fuel gas flow grooves 52 connected to the first and second buffers 50a, 50b.

The first and second buffers 50a, 50b are formed by a plurality of discontinuous flow grooves or bosses. The fuel gas flow grooves 52 extend in parallel with each other on the surface 18a. Each of the fuel gas flow grooves 52 are curved.

The first and second buffers 50a, 50b are formed by a plurality of discontinuous flow grooves or bosses. The oxygen-containing gas flow grooves 52 extend in parallel with each other on the surface 18a. Each of the oxygen-containing gas flow grooves 52 are curved.

As shown in FIG. 1, the second separator 18 has a coolant flow field 58 on its surface 18b opposite to the surface 18a. The coolant flow field 58 includes a predetermined number of straight flow grooves extending in parallel vertically in a direction indicated by an arrow C. Opposite ends of the straight flow grooves 60 are connected to the coolant supply passage 28 and the coolant discharge passage 30. The seal members 19 have openings 62 centrally at positions corresponding to the anode 34 and the cathode 36 (see FIG. 1).

Operation of the fuel cell 10 will be described.

As shown in FIG. 1, a fuel gas such as a hydrogen-containing gas, an oxidizing gas such as an oxygen-containing gas, and a coolant such as pure water, an ethylene glycol or an oil are supplied into the fuel cell 10. As shown in FIGS. 1 and 3, the oxygen-containing gas supplied to the oxygen-containing gas supply passage 20 extending in the direction indicated by the arrow A flows into the oxygen-containing gas flow field 38.

Specifically, the first buffer 40a of the oxygen-containing gas flow field 38 is connected to the oxygen-containing gas supply passage 20. The oxygen-containing gas is supplied from the oxygen-containing gas supply passage 20 into the first buffer 40a. The first buffer 40a is connected to the oxygen-containing gas flow grooves 42, and the oxygen-containing gas is supplied through the oxygen-containing gas flow grooves 42 along the cathode 36 of the membrane electrode assembly 14.

The fuel gas from the fuel gas supply passage 24 extending in the direction indicated by the arrow A flows into the fuel gas flow field 48. As shown in FIG. 4, the fuel gas flow field 48 includes the first buffer 50a connected to the fuel gas supply passage 24. The fuel gas is supplied to the fuel gas flow grooves 52 through the first buffer 50a. The fuel gas flows through the fuel gas flow grooves 52, and is supplied along the anode 34 of the membrane electrode assembly 14.

In each of the membrane electrode assemblies 14, the oxygen-containing gas supplied to the cathode 36, and the fuel gas supplied to the anode 34 are consumed in the electrochemical reactions at catalyst layers of the cathode 36 and the anode 34 for generating electricity (see FIG. 2).

Then, the oxygen-containing gas supplied to, and consumed at the cathode 36 flows through the second buffer 40b, and is discharged into the oxygen-containing gas discharge passage 26 (see FIG. 3). Likewise, the fuel gas supplied to, and consumed at the anode 34 flows through the second buffer 50b, and discharged into the fuel gas discharge passage 22 (see FIG. 4).

Further, as shown in FIG. 1, the coolant supplied to the coolant supply passage 28 flows into the coolant flow field 58 of the second separator 18. The coolant flows vertically (upwardly) along the straight flow grooves 60. After the coolant is used for cooling the membrane electrode assembly 14, the coolant is discharged into the coolant discharge passage 30.

In the first embodiment, the oxygen-containing gas supply passage 20 includes the first and second straight sections 20a, 20b elongated (extending) along two sides (in the direction indicated by the arrow B and in the direction indicated by the arrow C) from the corner at the upper portion of one end of the first separator 16. Therefore, as shown in FIG. 3, the oxygen-containing gas supplied to the oxygen-containing gas supply passage 20 flows vertically (downwardly) from the first straight section 20a to the first buffer 40a, and flows horizontally from the second straight section 20b to the first buffer 40a.

Therefore, the oxygen-containing gas is supplied to the first buffer 40a from the different directions to cause collision of the flows in the different directions, and the oxygen-containing gas is distributed uniformly in the first buffer 40a. Thus, in the surface 16a of the first separator 16, it is possible to suitably supply the oxygen-containing gas to the entire oxygen-containing gas flow field 38. In comparison with the conventional structure, the area of the flow field for virtually guiding the oxygen-containing gas from the oxygen-containing gas supply passage 20 to the electrode surface 64 (see FIG. 3) is increased significantly, and the oxygen-containing gas is uniformly supplied to the entire area in the electrode surface 64. Accordingly, the pressure loss in the flow field, i.e., the oxygen-containing gas flow field 38 is effectively reduced. The compressor or the like for supplying the oxygen-containing gas is not large. Thus, reduction in the overall thickness of the fuel cell 10 is achieved easily.

The oxygen-containing gas supply passage 20, the oxygen-containing gas discharge passage 26, the fuel gas supply passage 24, the fuel gas discharge passage 22, the coolant supply passage 28, and the coolant discharge passage 30 are provided along four sides of the first separator 16 including the respective corners of the first separator 16. Therefore, the space in the surface of the first separator 16 is utilized efficiently, and the utilization ratio of the electrode surface of the first separator 16 is improved. Accordingly, the overall size and weight of the fuel cell 10 are reduced advantageously.

Further, the electrode surface 64 of the first separator 16 is surrounded by the oxygen-containing gas supply passage 20, the oxygen-containing gas discharge passage 26, the fuel gas supply passage 24, the fuel gas discharge passage 22, the coolant supply passage 28, and the coolant discharge passage 30. Therefore, the electrode surface 64 is not cooled directly the external air. The water condensation in the electrode surface 64 is effectively prevented. Thus, the water in the humidified reactant gases such as the oxygen-containing gas and the fuel gas can be utilized effectively. It is possible to reduce the amount of the condensed water in the electrode surface 64, and prevent the decrease in the power generation performance of the fuel cell 10.

The oxygen-containing gas discharge passage 26 includes the first and second straight sections 26a, 26b extending along two sides (in the direction indicated by the arrow B and in the direction indicated by the arrow C). Components of the fuel cell 10 are stacked in the horizontal direction. As shown in FIG. 3, the position of the first straight section 26a is lower than the position of the electrode surface 64. Therefore, even if the condensed water is retained in the oxygen-containing gas discharge passage 26, the oxygen-containing gas flow field 38 is not filled with the condensed water. Thus, the condensed water is discharged efficiently, and the water is not retained on the electrode surface 64. Therefore, the desired power generation performance of the fuel cell 10 is maintained.

The second separator 18 have the same advantages as with the first metal separator 16. Therefore, detailed description about the second metal separator 18 will be omitted.

Figure 5:
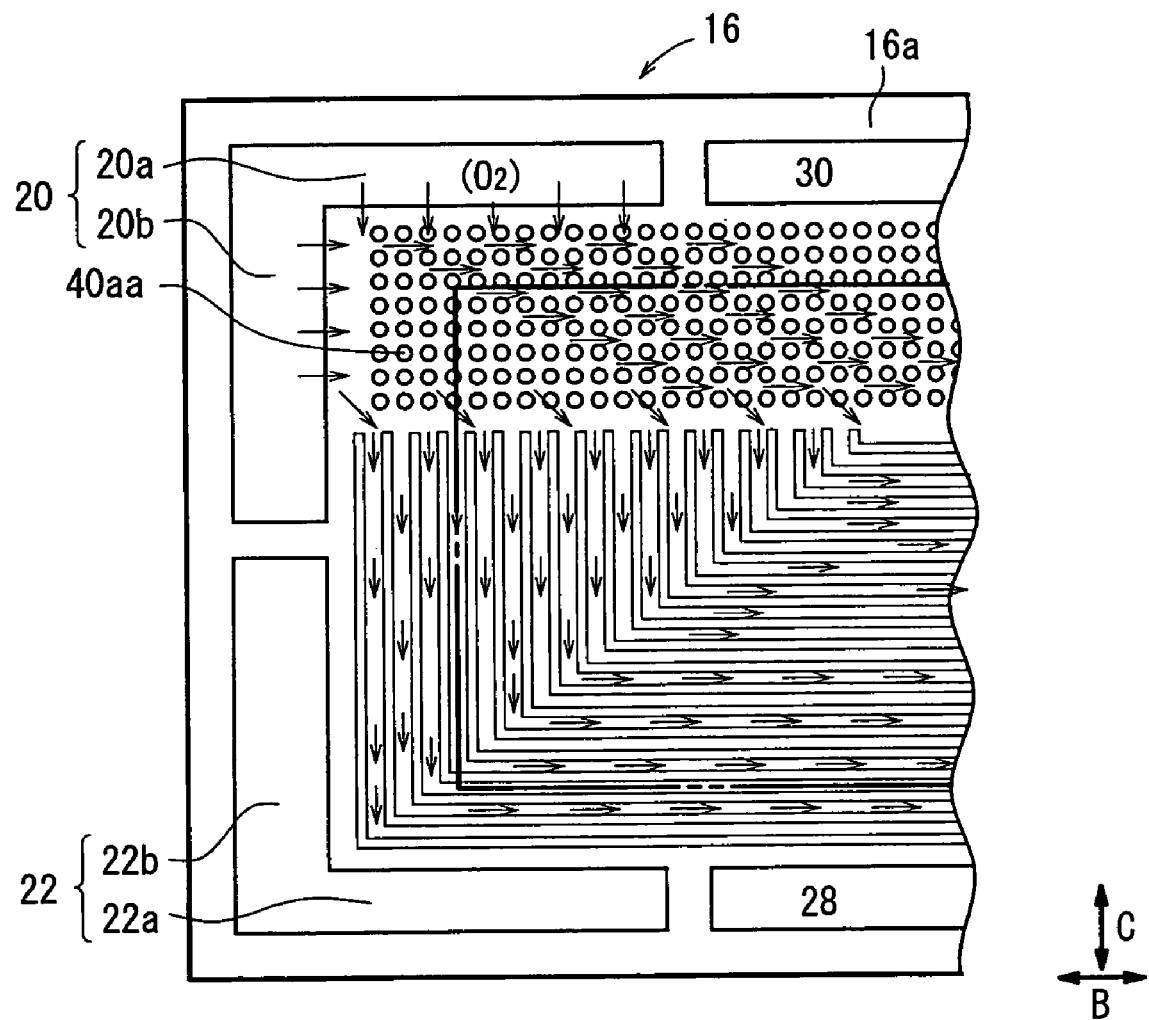
FIG. 5 is a front view showing a first separator having circular elements forming a buffer.

In the first embodiment, the first buffers 40a, 50a and the second buffers 40b, 50b include elements having a rectangular shape. However, the present invention is not limited in this respect. For example, as shown in FIG. 5, a first buffer 40aa including elements having a circular shape may be used instead of the first buffer 40a. Further, in addition to the rectangular shape, various shapes such as polygonal shapes may be adopted for the elements in the buffer.

Figure 6:
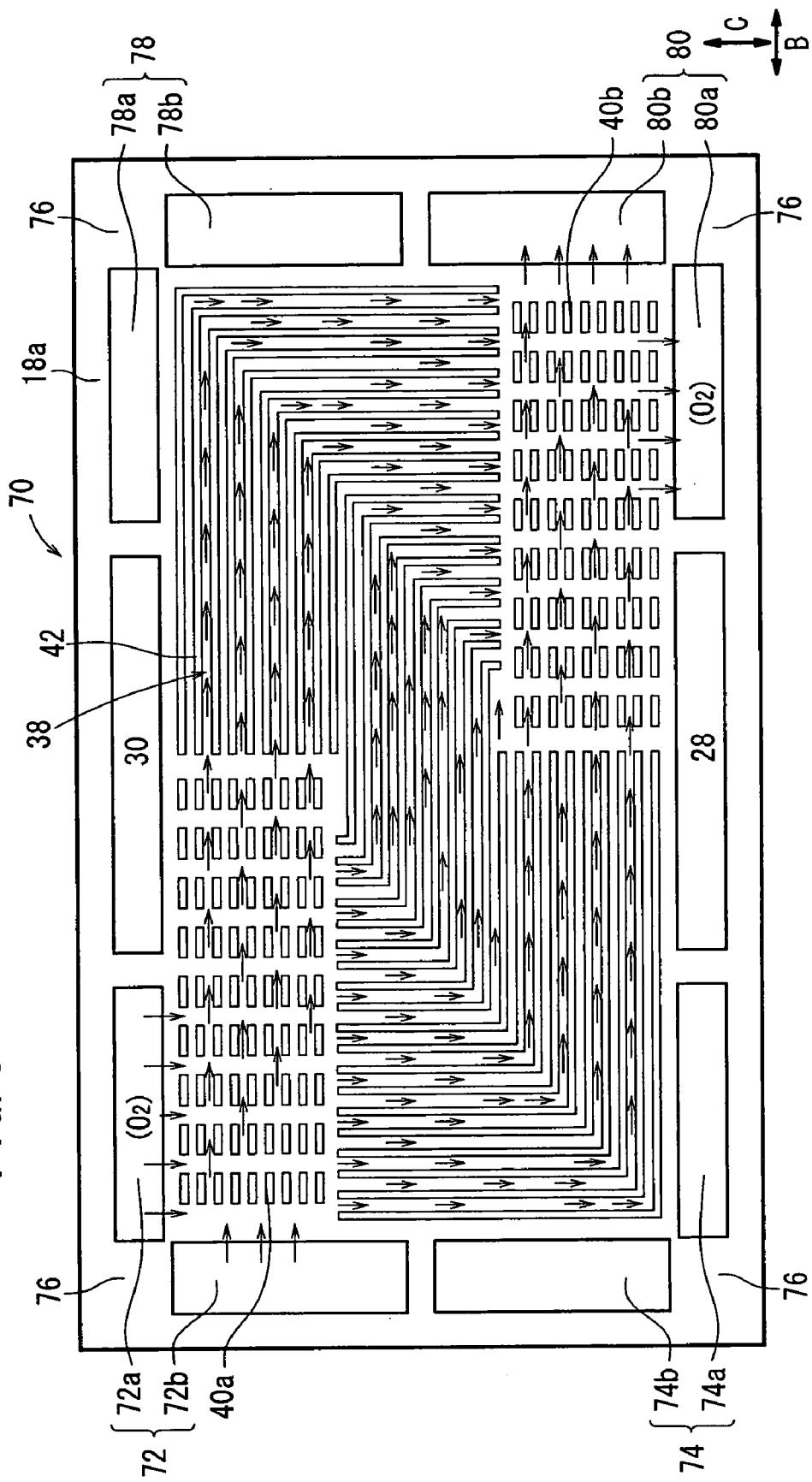
FIG. 6 is a front view showing a first separator of a fuel cell according to a second embodiment of the present invention.

FIG. 6 is a front view showing a first separator 70 of a fuel cell according to a second embodiment of the present invention. In FIG. 6, the constituent elements of the first separator 70 that are identical to those of the first separator 16 of the fuel cell 10 according to the first embodiment are labeled with the same reference numeral, and description thereof will be omitted. In third through eighth embodiments as described later, the constituent elements that are identical to those of the first separator 16 of the fuel cell 10 according to the first embodiment are labeled with the same reference numeral, and description thereof will be omitted.

The first separator 70 has an oxygen-containing gas supply passage 72 and a fuel gas discharge passage 74 at one end in the direction indicated by the arrow B. The oxygen-containing gas supply passage 72 includes first and second straight sections 72a, 72b separately and the fuel gas discharge passage 74 includes first and second straight sections 74a, 74b separately. The first straight sections 72a, 74a are elongated in the direction indicated by the arrow B and the second straight sections 72b, 74b are elongated in the direction indicated by the arrow C. The first straight section 72a and the second straight section 72b are separated at an upper corner of the first separator 70, and the first straight section 74a and the second straight section 74b are separated at a lower corner of the first separator 70. Reinforcement ribs 76 are formed at the respective corners.

The first separator 70 has a fuel gas supply passage 78 and an oxygen-containing gas discharge passage 80 at the other end in the direction indicated by the arrow B. The fuel gas supply passage 78 includes first and second straight sections 78a, 78b separately and the oxygen-containing gas discharge passage 80 includes first and second straight sections 80a, 80b separately. The first straight sections 78a, 80b are elongated in the direction indicated by the arrow B and the second straight sections 78b, 80b are elongated in the direction indicated by the arrow C. The first straight section 78a and the second straight section 78b are separated from each other, and the first straight section 80a and the second straight section 80b are separated from each other. Reinforcement ribs 76 are formed at the respective upper and lower corners of the first separator 70.

In the second embodiment, the same advantages as with the first embodiment can be obtained. Further, the ribs 76 are formed at the four corners of the first separator 70. Thus, the four corners of the first separator 70 are reinforced desirably by the ribs 76, and the strength of the first separator 70 is improved.

Figure 7:
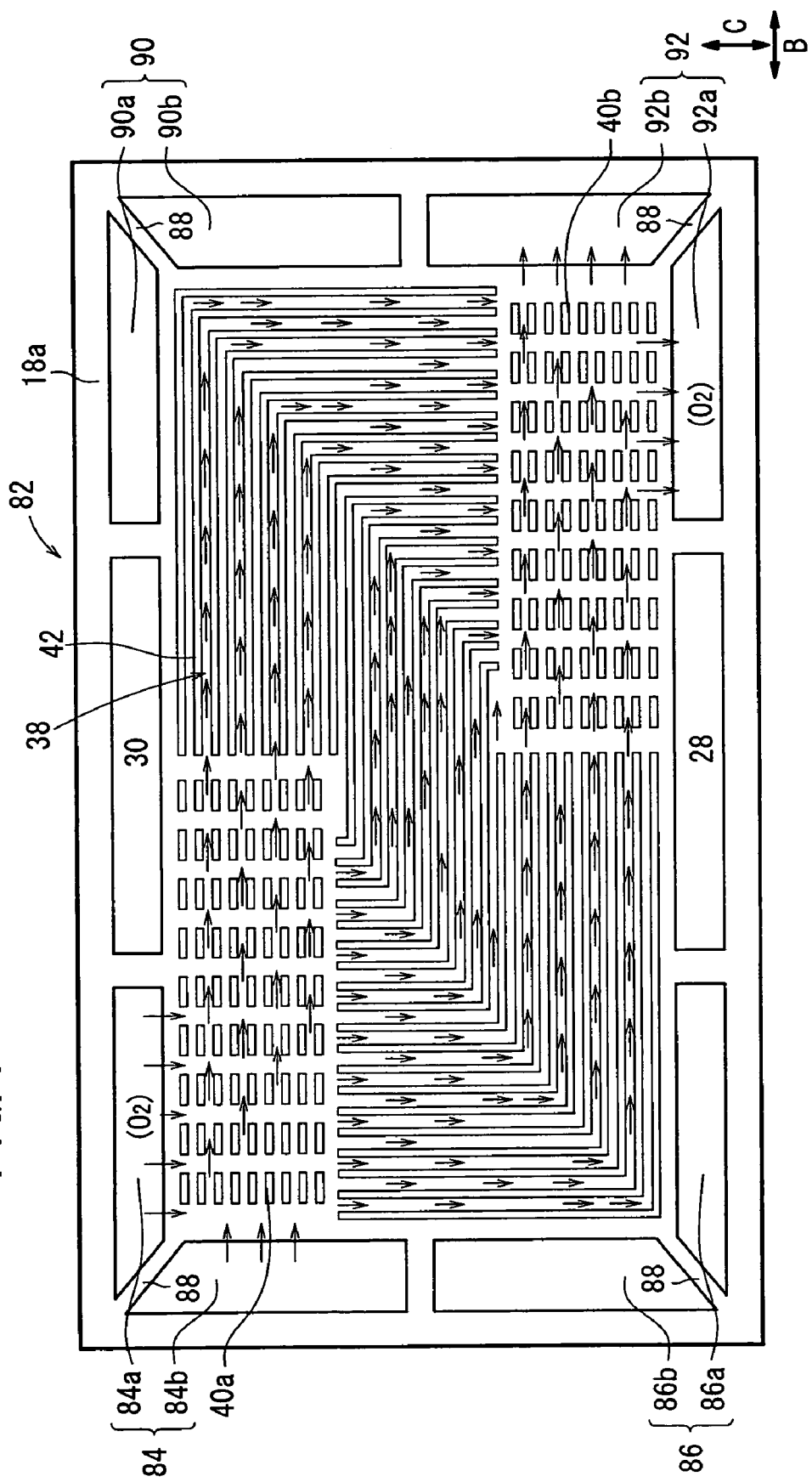
FIG. 7 is a front view showing a first separator of a fuel cell according to a third embodiment of the present invention.

FIG. 7 is a front view of a first separator 82 of a fuel cell according to the third embodiment of the present invention.

The first separator 82 has an oxygen-containing gas supply passage 84 and a fuel gas discharge passage 86 at one end in the direction indicated by the arrow B. The oxygen-containing gas supply passage 84 includes first and second straight sections 84a, 84b separately and the fuel gas discharge passage 86 includes first and second straight sections 86a, 86b separately. The first straight sections 84a, 86a are angled toward corners of the first separator 82, and elongated in the direction indicated by the arrow B. The second straight sections 84b, 86b are angled toward the corners of the first separator 82, and elongated in the direction indicated by the arrow C. The first straight section 84a and the second straight section 84b are separated at the upper corner of the first separator 82, and the first straight section 86a and the second straight section 86b are separated at the lower corner of the first separator 82. Reinforcement ribs 88 are formed at the respective corners.

The first separator 82 has a fuel gas supply passage 90 and an oxygen-containing gas discharge passage 92 at the other end in the direction indicated by the arrow B. The fuel gas supply passage 90 includes first and second straight sections 90a, 90b separately and the oxygen-containing gas discharge passage 92 includes first and second straight sections 92a, 92b separately. The first straight sections 90a, 92a are angled toward corners of the first separator 82, and elongated in the direction indicated by the arrow B. The second straight sections 90b, 92b are angled toward the corner of the first separator 82, and elongated in the direction indicated by the arrow C. The first straight section 90a and the second straight section 90b are separated at the upper corner of the first separator 82, and the first straight section 92a and the second straight section 92b are separated at the lower corner of the first separator 82. Reinforcement ribs 88 are formed at the respective upper and lower corners of the first separator 82.

In the third embodiment, the first straight sections 84a, 86a, 90a, 92a and the second straight sections 84b, 86b, 90b, 92b are angled toward the four corners of the first separator 82, respectively. Therefore, the areas of openings of the oxygen-containing gas supply passage 84, the fuel gas discharge passage 86, the fuel gas supply passage 90, and the oxygen-containing gas discharge passage 92 are large, and the utilization ratio of the electrode surfaces (the area of the electrode surfaces with respect to the area of surfaces of the first separator 82) improves effectively.

Figure 8:
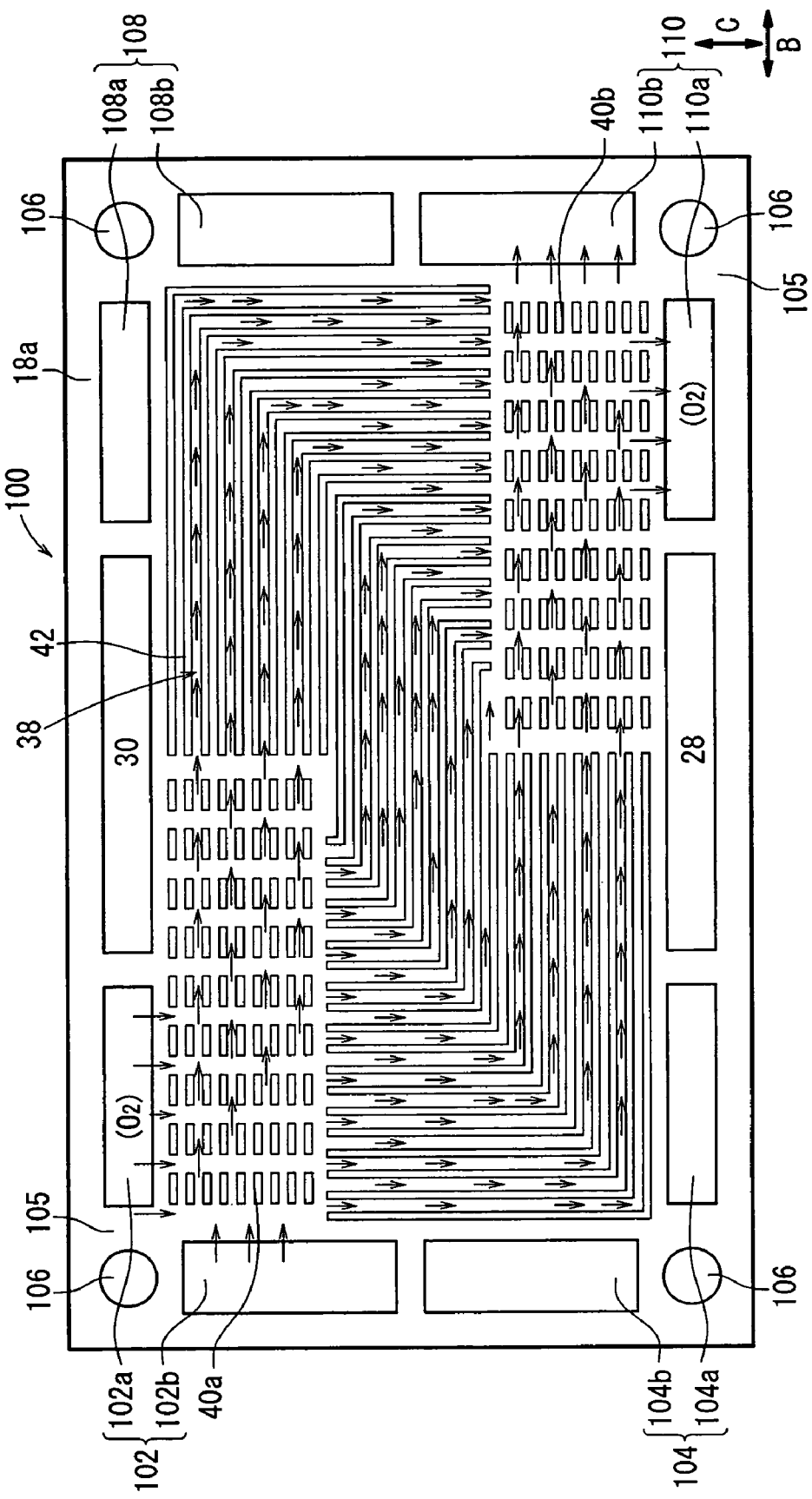
FIG. 8 is a front view showing a first separator of a fuel cell according to a fourth embodiment of the present invention.

FIG. 8 is a front view showing a first separator 100 of a fuel cell according to the fourth embodiment of the present invention.

The first separator 100 has an oxygen-containing gas supply passage 102 and a fuel gas discharge passage 104 at one end in the direction indicated by the arrow B. The oxygen-containing gas supply passage 102 includes first and second straight sections 102a, 102b separately and the fuel gas discharge passage 104 includes first and second straight sections 104a, 104b separately. The first straight sections 102a, 104a are elongated in the direction indicated by the arrow B and the second straight sections 102b, 104b are elongated in the direction indicated by the arrow C.

The first straight section 102a and the second straight section 102b are separated at an upper corner of the first separator 100, and the first straight section 104a and the second straight section 104b are separated at a lower corner of the first separator 100. Reinforcement ribs 105 are formed at the respective corners. The ribs 105 have holes 106 for inserting stack tightening bolts (or positioning knocks).

The first separator 100 has a fuel gas supply passage 108 and an oxygen-containing gas discharge passage 110 at the other end in the direction indicated by the arrow B. The fuel gas supply passage 108 includes first and second straight sections 108a, 108b separately and the oxygen-containing gas discharge passage 110 includes first and second straight sections 110a, 110b separately. The first straight sections 108a, 110a are elongated in the direction indicated by the arrow B and the second straight sections 108b, 110b are elongated in the direction indicated by the arrow C.

The first straight section 108a and the second straight section 108b are separated at an upper corner of the first separator 100, and the first straight section 110a and the second straight section 110b are separated at a lower corner of the first separator 100. Ribs 105 are formed at the respective upper and lower corners. The ribs 105 have holes 106 for inserting stack tightening bolts (or positioning knocks).

In the fourth embodiment, the same advantages as with the second embodiment can be obtained. Further, the holes 106 are formed at the four corners. With the holes 106, tightening or positioning of the entire fuel cell can be carried out.

Figure 9:
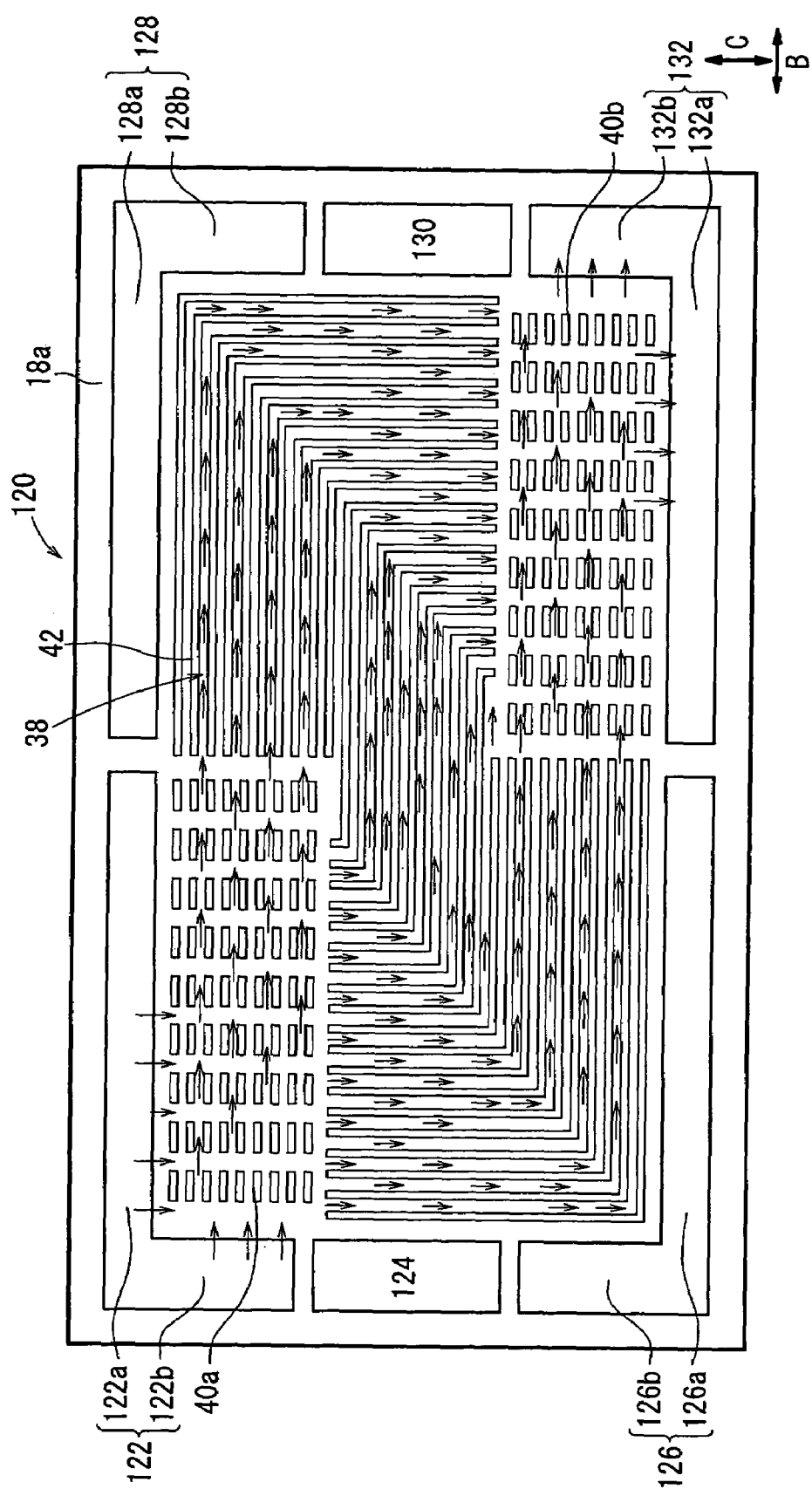
FIG. 9 is a front view showing a first separator of a fuel cell according to a fifth embodiment of the present invention.

FIG. 9 is a front view showing a first separator 120 of a fuel cell according to the fifth embodiment of the present invention.

The first separator 120 has an oxygen-containing gas supply passage 122, a coolant supply passage 124, and a fuel gas discharge passage 126 at one end in the direction indicated by the arrow B. The first separator 120 has a fuel gas supply passage 128, a coolant discharge passage 130, and an oxygen-containing gas discharge passage 132 at the other end in the direction indicated by the arrow B. The oxygen-containing gas supply passage 122 includes a first straight section 122a extending in the direction indicated by the arrow B and a second straight section 122b extending in the direction indicated by the arrow C. The fuel gas discharge passage 126 includes a first straight section 126a extending in the direction indicated by the arrow B and a second straight section 126b extending in the direction indicated by the arrow C. The first straight sections 122a, 126a are relatively elongated toward a substantially middle portion of the first separator 120.

Likewise, the fuel gas supply passage 128 includes a first straight section 128*a* extending in the direction indicated by the arrow B and a second straight section 128*b* extending in the direction indicated by the arrow C. The oxygen-containing gas discharge passage 132 includes a first straight section 132*a* extending in the direction indicated by the arrow B and a second straight section 132*b* extending in the direction indicated by the arrow C. The first straight sections 128*a*, 132*a* are relatively elongated toward a substantially middle portion of the first separator 120.

In the fifth embodiment, the first straight sections 122*a*, 126*a* and the first straight sections 128*a*, 132*a* are elongated toward the substantially middle portions of the first separator 120. The oxygen-containing gas supply passage 122 and the oxygen-containing gas discharge passage 132 are adjacent to each other. The fuel gas supply passage 128 and the fuel gas discharge passage 126 are adjacent to each other. Therefore, the pressure loss of the fuel gas is reduced advantageously.

Figure 10:
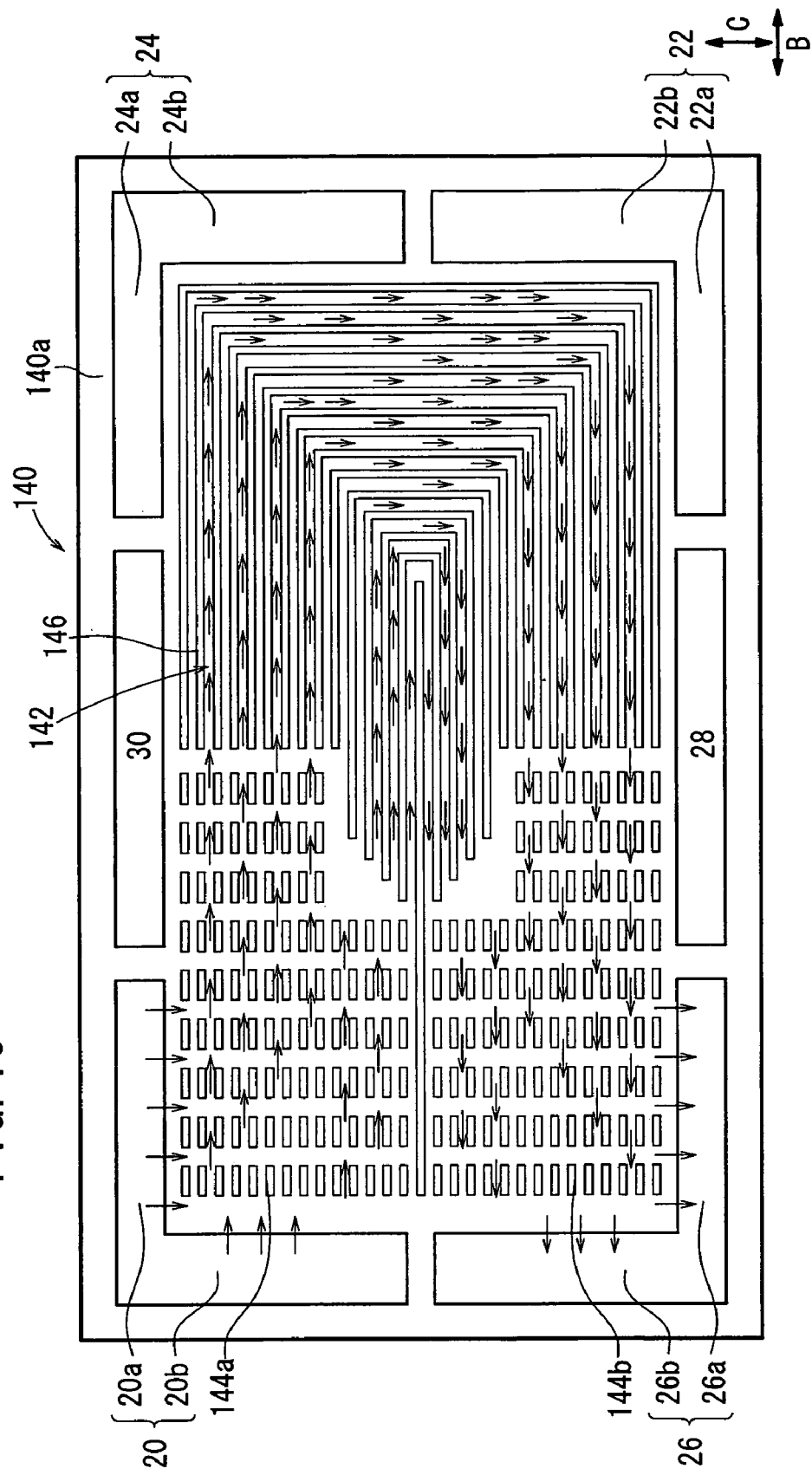
FIG. 10 is a front view showing a first separator of a fuel cell according to a sixth embodiment of the present invention.

FIG. 10 is a front view showing a first separator 140 of a fuel cell according to the sixth embodiment of the present invention.

The first separator 140 has an oxygen-containing gas supply passage 20 and an oxygen-containing gas discharge passage 26 at one end in the direction indicated by the arrow B. Further, the first separator 140 has a fuel gas supply passage 24 and a fuel gas discharge passage 22 on the other end in the direction indicated by the arrow B.

An oxygen-containing gas flow field (reactant gas flow field) 142 is formed on a surface 140*a* of the first separator 140. The oxygen-containing gas flow field 142 includes first and second buffers 144*a*, 144*b* near the oxygen-containing gas supply passage 20 and the oxygen-containing gas discharge passage 26, i.e., at upper and lower positions of one end of the first separator 140 in the direction indicated by the arrow B. The first and second buffers 144*a*, 144*b* are connected by a plurality of oxygen-containing gas flow grooves 146 having a substantially U-shape.

Figure 11:
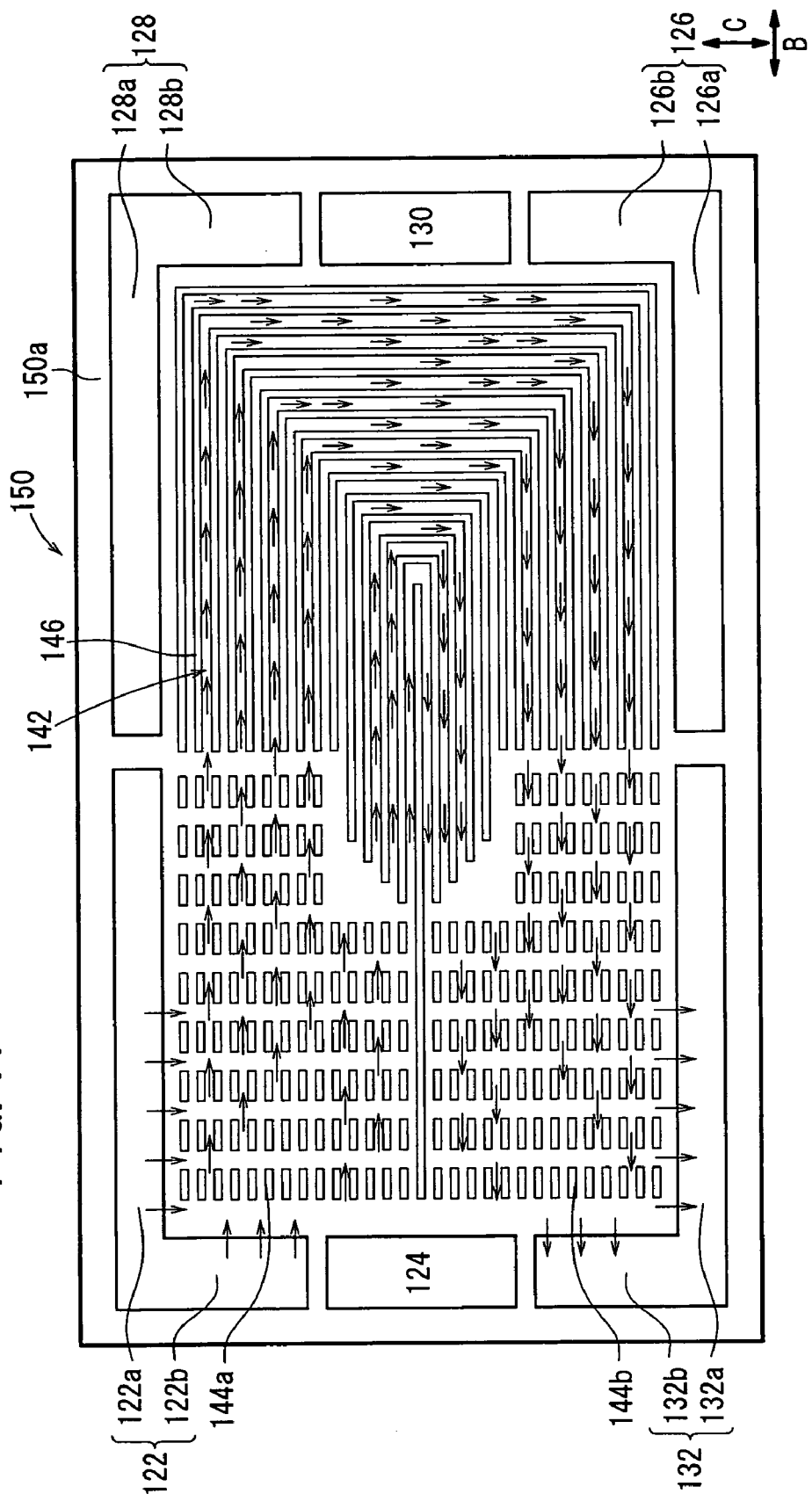
FIG. 11 is a front view showing a first separator of a fuel cell according to a seventh embodiment of the present invention.

FIG. 11 is a front view showing a first separator 150 of a fuel cell according to a seventh embodiment of the present invention.

The structure of the first separator 150 is achieved by combining the structure of the first separator 120 and the structure of the first separator 140. The first separator 150 has an oxygen-containing gas supply passage 122, a coolant supply passage 124, and an oxygen-containing gas discharge passage 132 at one end in the direction indicated by the arrow B. Further, the first separator 150 has a fuel gas supply passage 128, a coolant discharge passage 130, and a fuel gas discharge passage 126 at the other end in the direction indicated by the arrow B.

Figure 12:
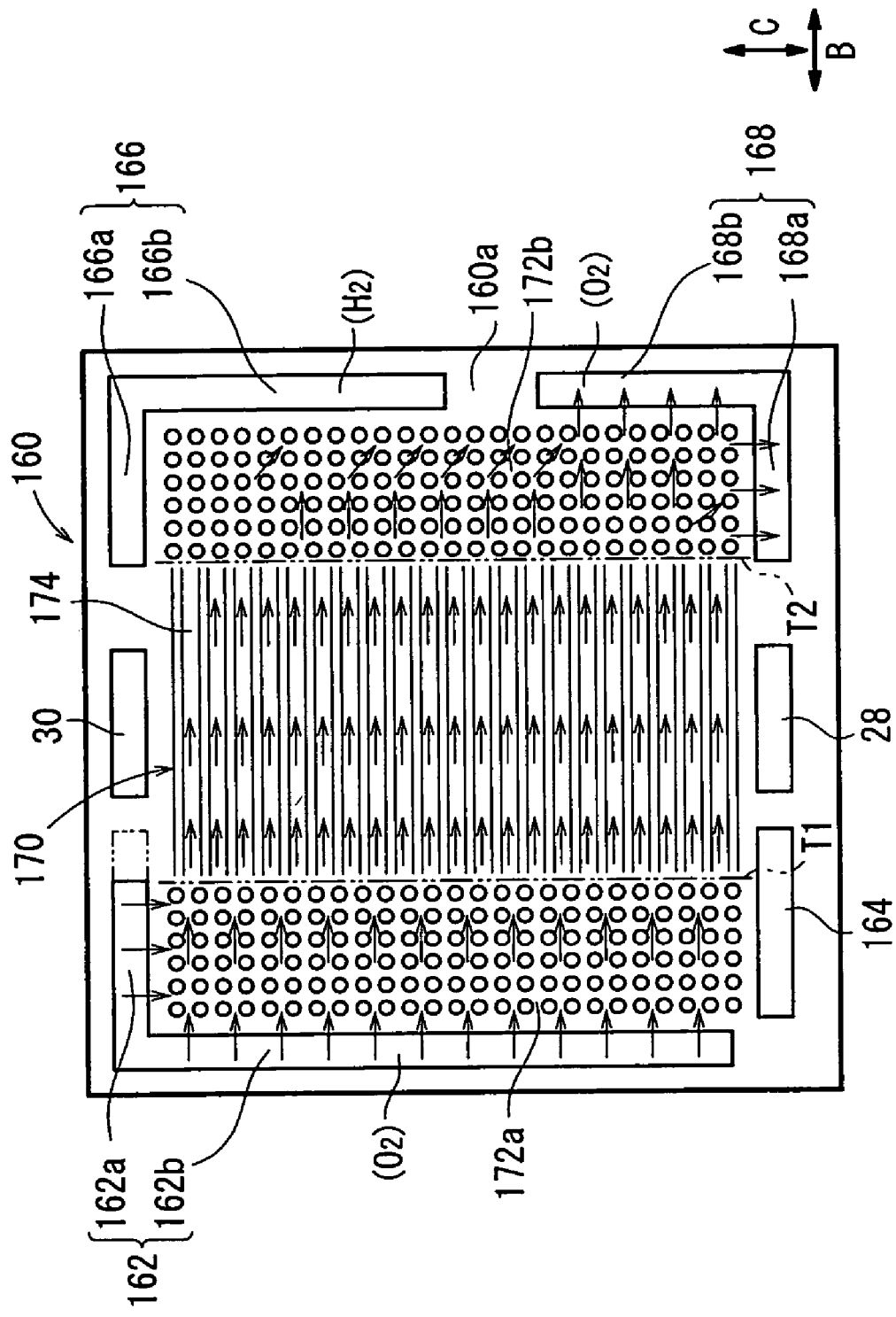
FIG. 12 is a front view showing a first separator of a fuel cell according to an eighth embodiment of the present invention.
Figure 13:
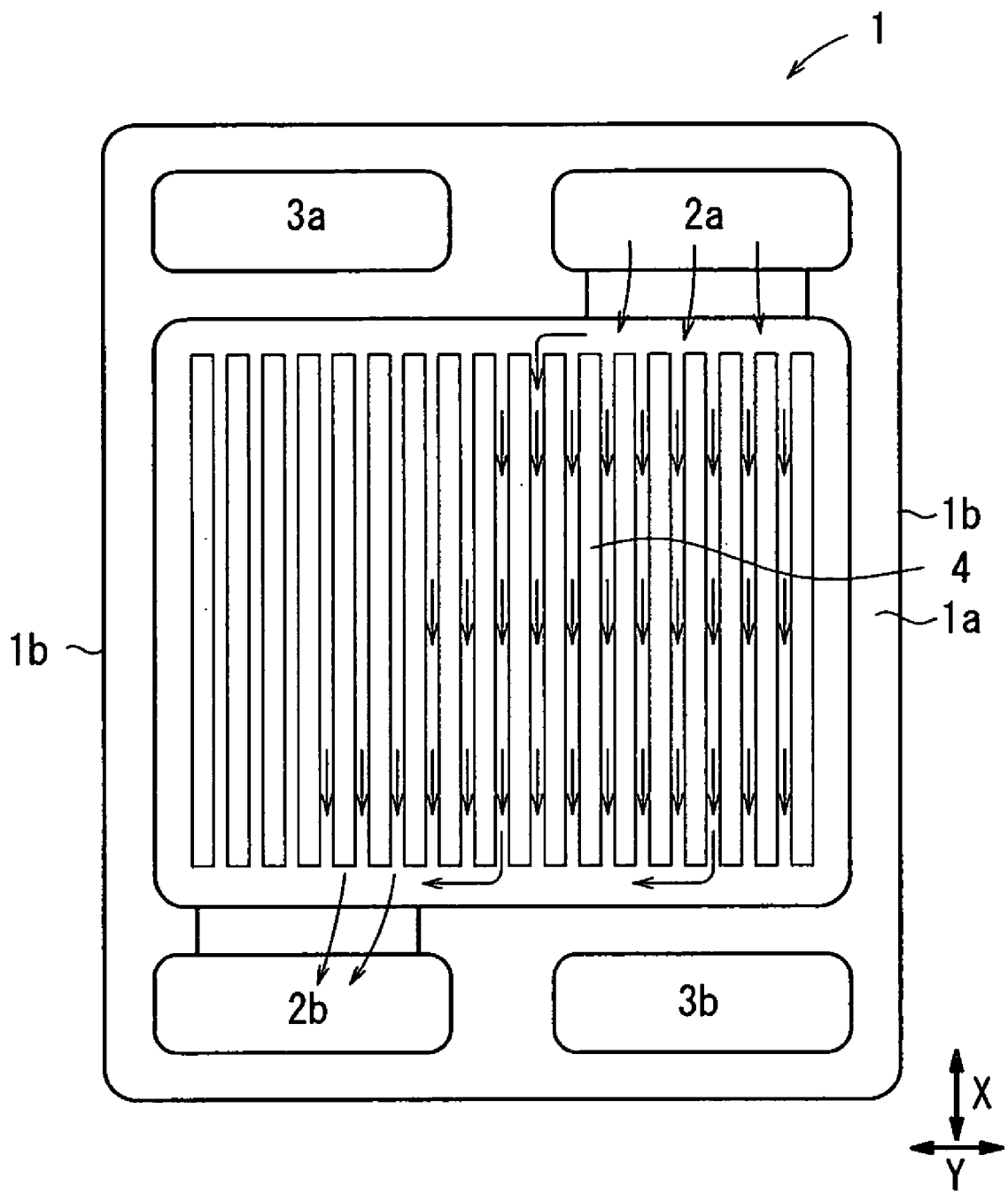
FIG. 13 is a front view showing a separator disclosed in Japanese Laid-open Patent Publication No. 2001-266910.

FIG. 12 is a front view showing a first separator 160 of a fuel cell according to the eighth embodiment of the present invention.

The first separator 160 has a substantially square shape. The first separator 160 has an oxygen-containing gas supply passage 162 and a fuel gas discharge passage 164 at one end in the direction indicated by the arrow B.

The oxygen-containing gas supply passage 162 includes a first straight section 162*a* elongated in the direction by the arrow B, and a second straight section 162*b* elongated in the direction by the arrow C. The fuel gas discharge passage 164 is elongated in the direction indicated by the arrow B.

The first separator 160 has a fuel gas supply passage 166 and an oxygen-containing gas discharge passage 168 at the other end in the direction indicated by the arrow B. The fuel gas supply passage 166 has a first straight section 166*a* elongated in the direction indicated by the arrow B and a second straight section 166*b* elongated in the direction indicated by the arrow C. The oxygen-containing gas discharge passage 168 includes a first straight section 168*a* elongated in the direction indicated by the arrow B and a second straight section 168*b* elongated in the direction indicated by the arrow C.

The cross sectional area of the opening of the oxygen-containing gas supply passage 162 is larger than the cross sectional area of the opening of the oxygen-containing gas discharge passage 168. The cross sectional area of the fuel gas supply passage 166 is larger than the cross sectional area of the opening of the fuel gas supply passage 164.

The first separator 160 has an oxygen-containing gas flow field (reactant gas flow field) 170 on its surface 160*a* facing a cathode (not shown). The oxygen-containing gas flow field 170 includes a first buffer 172*a* near the oxygen-containing gas supply passage 162 and a second buffer 172*b* near the oxygen-containing gas discharge passage 168, and a plurality of substantially straight oxygen-containing gas flow grooves 174 connected between the first and second buffers 172*a*, 172*b*. The straight oxygen-containing gas flow grooves 174 extend in parallel with each other in the direction indicated by the arrow B. The substantially straight grooves herein include wave pattern grooves curved or bent along the flow direction of the oxygen-containing gas (reactant gas).

An inlet end position T1 of the oxygen-containing gas flow field 170 is substantially in alignment with an end position of the first straight section 162*a* of the oxygen-containing gas supply passage 162 extending in the direction indicated by the arrow B. Likewise, an outlet end position T2 of the oxygen-containing gas flow field 170 are substantially in alignment with an end position of the first straight section 168*a* of the oxygen-containing gas discharge passage 168 extending in the direction indicated by the arrow B.

In the eighth embodiment, the oxygen-containing gas flow field 170 includes the plurality of substantially straight oxygen-containing gas flow grooves 174 between the first and second buffers 172*a*, 172*b*. Therefore, the pressure loss of the oxygen-containing gas in the oxygen-containing gas flow field 170 is minimized. In particular, if the electrode surface has a substantially square shape, the outer circumferential dimension of the first separator 160 is minimized. Further, it is possible to improve the heat retaining property of the first separator 160.

Further, the inlet end position T1 of the oxygen-containing gas flow field 170 is substantially in alignment with the end position of the first straight section 162*a* of the oxygen-containing gas supply passage 162 extending toward the oxygen-containing gas flow field 170. If the end of the first straight section 162*a* extends inwardly toward the oxygen-containing gas flow field 170 beyond the inlet end position T1 of the oxygen-containing gas flow field 170 (see chain double-dashed line in FIG. 12), the oxygen-containing gas may not flow from the end into the oxygen-containing gas flow field 170.

Since the end position of the first straight section 162*a* is in alignment with the inlet end position T1 of the oxygen-containing gas flow field 170, it is possible to supply the oxygen-containing gas in the width direction of the oxygen-containing gas (the direction perpendicular to the flow direction of the oxygen-containing gas flow grooves 174). Therefore, the desired power generation function can be achieved.

Likewise, in the oxygen-containing gas discharge passage 168, an end position of the first straight section 168*a* is substantially in alignment with an outlet end position T2 of the oxygen-containing gas flow field 170. Thus, the oxygen-containing gas is smoothly discharged into the entire oxygen-containing gas discharge passage 168.

Further, the cross sectional area of the opening of the oxygen-containing gas supply passage 162 is larger than the cross sectional area of the opening of the oxygen-containing gas discharge passage 168. The flow rate of the oxygen-containing gas near the oxygen-containing gas discharge passage 168 is small after consumption of the oxygen-containing gas. Since the cross sectional area of the opening of the oxygen-containing gas discharge passage 168 is smaller than the cross sectional area of the opening of the oxygen-containing gas supply passage 162, the oxygen-containing gas flows smoothly.

Likewise, the cross sectional area of the opening of the fuel gas supply passage 166 is larger than the cross sectional area of the opening of the fuel gas discharge passage 164. The flow rate of the fuel gas is small after consumption of the fuel gas, and the fuel gas is smoothly discharged into the fuel gas discharge passage 164. The flow rate of the discharged fuel gas is considerably small in comparison with the flow rate of the discharged oxygen-containing gas. Therefore, the cross sectional area of the opening of the fuel gas discharge passage 164 is minimized.

In the first through eighth embodiments, the reactant gases, i.e., the oxygen-containing gas and the fuel gas flow downwardly. Alternatively, the embodiments may be modified such that the reactant gases flow upwardly.

Further, in the embodiments, the components of the fuel cell are stacked horizontally. The embodiments may be modified such that the components are stacked vertically.

In the fuel cell according to the present invention, at least the supply passage or the discharge passage for the reactant gas includes the first and second straight sections extending along the two sides of the separator. Therefore, the reactant gas is supplied to the reactant flow field from different directions to the reactant flow field to cause collision of the flows in the different directions, and the reactant gas is distributed uniformly in the reactant gas flow field. Therefore, the reactant gas is supplied to the electrode surface uniformly and reliably. Further, in comparison with the conventional structure, the area of the flow field for guiding the reactant gas from the reactant gas passage to the electrode surface is large. Thus, the pressure loss in the passage is effectively reduced. Accordingly, the thin cell structure is achieved easily without using any large compressor or the like for supplying the reactant gas.

The flow passages are provided at outer edges of the separator including the corners of the separator. Therefore, the utilization ratio in the electrode surface of the separator is effectively improved. Accordingly, the overall size and weight of the fuel cell are reduced.

Further, the electrode surface is surrounded by the fluid passages formed at outer edges of the separator. Therefore, the electrode surface is not directly cooled by the external surface, and the water condensation in the electrode surface is prevented. Therefore, it is possible to reduce the amount of the condensation water in the electrode surface, and prevent the decrease in the power generation performance.

The invention claimed is:

1. A fuel cell formed by stacking an electrolyte electrode assembly and a pair of separators alternately, said electrolyte electrode assembly including a pair of electrodes and an electrolyte interposed between said electrodes, wherein a reactant gas supply passage and a reactant gas discharge passage extend through said separators in a stacking direction for at least supplying an oxygen-containing gas or a fuel gas as a reactant gas to a reactant gas flow field formed in a separator surface facing said membrane electrode assembly and discharging said reactant gas from said reactant gas flow field; and wherein at each corner of the separator, there is either one reactant gas supply passage or one reactant gas discharge passage, wherein each of said passages includes first and second straight sections elongated along two sides at each corner of said separator, respectively.

2. A fuel cell according to claim 1, wherein said first straight section and said second straight section are separated from each other at the corner of said separator to form a rib between said first and second straight sections.

3. A fuel cell according to claim 2, wherein said rib has a hole for inserting a stack tightening bolt or a positioning knock.

4. A fuel cell according to claim 1, wherein a coolant supply passage and a coolant discharge passage extend through said separators in the stacking direction for supplying and discharging a coolant; and said reactant gas supply passage, said reactant gas discharge passage, said coolant supply passage, and said coolant discharge passage are formed around an electrode surface of said electrolyte electrode assembly (14).

5. A fuel cell according to claim 1, said electrolyte electrode assembly and said separator are stacked horizontally.

6. A fuel cell according to claim 1, wherein buffers are provided at corners of said separator, and said buffers are connected between said reactant flow field and said reactant gas supply passage and said reactant gas discharge passage.

7. A fuel cell according to claim 1, wherein said separator has a substantially rectangular shape in a plan view, and at least one of said reactant gas supply passages and at least one of reactant gas discharge passages are provided around corners at diagonal positions of said separator.

8. A fuel cell according to claim 7, wherein said separator has a substantially square shape in a plan view, and an inlet buffer is provided near at least one of said reactant gas supply passages and an outlet buffer is provided near at least one of said reactant gas discharge passages, and said reactant gas flow field includes substantially straight grooves between said inlet buffer and said outlet buffer.

9. A fuel cell according to claim 8, wherein at least one of an inlet end position and an outlet end position of said reactant gas flow field is in alignment with at least one of an end position of said reactant gas supply passage and an end position of said reactant gas discharge passage extending toward said reactant gas flow field.

10. A fuel cell according to claim 1, wherein said separator has a substantially rectangular shape in a plan view, at least one of said reactant gas flow fields includes a substantially U-shaped groove in a separator surface, and one of said reactant gas supply passages and one of said reactant gas discharge passages connected to one of said reactant gas flow fields are provided around the adjacent corners of said separator.

11. A fuel cell according to claim 1, wherein the cross sectional area of the opening of said reactant gas supply passage is larger than the cross sectional area of the opening of said reactant gas discharge passage.

12. A fuel cell formed by stacking an electrolyte electrode assembly and a pair of separators alternately, said electrolyte electrode assembly including a pair of electrodes and an electrolyte interposed between said electrodes, wherein a reactant gas supply passage and a reactant gas discharge passage extend through said separators in a stacking direction for at least supplying an oxygen-containing gas or a fuel gas as a reactant gas to a reactant gas flow field formed in a separator surface facing said membrane electrode assembly and discharging said reactant gas from said reactant gas flow field;

said reactant gas supply passage includes first and second straight sections elongated along two sides at first and second corners of said separator, respectively; and said reactant gas discharge passage includes first and second straight sections elongated along two sides at third and fourth corners of said separator, respectively.

* * * * *